United States Patent
Nakamura et al.

(12) 
(10) Patent No.: US 12,532,057 B2
(45) Date of Patent: Jan. 20, 2026

(54) VEHICULAR CAMERA

(71) Applicant: Panasonic Automotive Systems Co., Ltd., Kanagawa (JP)

(72) Inventors: Ken Nakamura, Kanagawa (JP); Kazuhiro Abe, Tokyo (JP); Yoshiaki Sakuma, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/594,879

(22) Filed: Mar. 4, 2024

(65) Prior Publication Data

US 2024/0305872 A1 Sep. 12, 2024

(30) Foreign Application Priority Data

Mar. 10, 2023 (JP) .................. 2023-037612

(51) Int. Cl.
*H04N 23/54* (2023.01)
*G03B 30/00* (2021.01)
*H04N 23/51* (2023.01)
*H04N 23/52* (2023.01)

(52) U.S. Cl.
CPC ............. *H04N 23/52* (2023.01); *G03B 30/00* (2021.01); *H04N 23/51* (2023.01)

(58) Field of Classification Search
CPC ......... H04N 23/52; H04N 23/51; G03B 30/00
See application file for complete search history.

(56) References Cited

U.S. PATENT DOCUMENTS

2016/0173757 A1* 6/2016 Choi .................... H04N 23/611
   348/262
2021/0344824 A1* 11/2021 Tokito .................... H04N 23/57

FOREIGN PATENT DOCUMENTS

JP        2021039381 A  *  3/2021
JP        2021170077 A  * 10/2021

* cited by examiner

*Primary Examiner* — Patrick E Demosky
(74) *Attorney, Agent, or Firm* — Seed Intellectual Property Law Group LLP

(57) ABSTRACT

A vehicular camera includes a cap having a barrel portion disposed to an outer circumference of a lens barrel and a second edge portion. At least a part of the second edge portion overlaps the circumference of the first lens and overlaps the first edge portion. Each of the plurality of protrusions is oriented from the barrel portion of the cap toward the optical axis, and protrudes along the first surface of the first lens. A first protrusion and a second protrusion are disposed adjacent to each other. A part of the first protrusion overlaps the first edge portion, and a part of the second protrusion overlaps the first edge portion. A first top portion and a second top portion are closer to the optical axis than the first edge portion, and the first surface of the first lens is exposed between the first and second top portions.

14 Claims, 9 Drawing Sheets

VEHICULAR CAMERA

CROSS-REFERENCE TO RELATED APPLICATIONS

This application is based on and claims priority under 35 USC 119 from Japanese Patent Application No. 2023-037612 filed on Mar. 10, 2023, the content of which is incorporated herein by reference.

TECHNICAL FIELD

The present disclosure relates to a vehicular camera.

BACKGROUND ART

With demands for improvements in vehicle safety, introduction of autonomous driving functions and the like in recent years, development of vehicular cameras that are mounted on vehicles and capture the inside and outside of the vehicles have become active (for example, see Patent Literature 1).

CITATION LIST

Patent Literature

Patent Literature 1: JP2021-170077A

SUMMARY OF INVENTION

Levels of demands for vehicle safety, autonomous driving functions and the like have been improving, and similar expectations are placed on vehicular cameras, including further improvements in their performance.

The present disclosure relates to a technique of providing a new vehicular camera.

A vehicular camera of the present disclosure includes a first lens having an optical axis; a second lens disposed along the optical axis; a lens barrel disposed along the optical axis, the lens barrel having a first tubular shape through which the optical axis passes, the first lens being disposed at one end portion of the first tubular shape and the second lens being disposed inside the first tubular shape; an imaging element disposed on the optical axis and receiving light passed through the first lens and the second lens in this order; a circuit board on which the imaging element is mounted; a housing accommodating at least the circuit board and to which the lens barrel is fixed; and a cap. The first lens has a first surface located opposite to the second lens and being a convex curve surface, and a second surface opposite to the first surface, and the lens barrel includes, at the one end portion of the first tubular shape, a first edge portion overlapping at least a part of a circumference of the first surface of the first lens. The cap includes a barrel portion having a second tubular shape and disposed to an outer circumference of the first tubular shape of the lens barrel, and a second edge portion continuous with the barrel portion at one end portion of the barrel portion, at least a part of the second edge portion overlapping the circumference of the first surface of the first lens and overlapping the first edge portion. The second edge portion of the cap includes a plurality of protrusions, each of the plurality of protrusions is oriented from the barrel portion of the cap toward the optical axis, and protrudes along the first surface of the first lens, a first protrusion among the plurality of protrusions and a second protrusion among the plurality of protrusions are disposed adjacent to each other, a part of the first protrusion overlaps the first edge portion, a part of the second protrusion overlaps the first edge portion, a first top portion of the first protrusion and a second top portion of the second protrusion are closer to the optical axis than the first edge portion, and the first surface of the first lens is exposed between the first top portion of the first protrusion and the second top portion of the second protrusion.

According to the present disclosure, in a vehicular camera, a first protrusion and a second protrusion provided around a first lens can disperse and remove a liquid foreign object including a raindrop or the like adhering to the first lens. Accordingly, the foreign object can be prevented from interfering with imaging and an imaging function of the vehicular camera can be ensured.

DESCRIPTION OF EMBODIMENTS

Hereinafter, an embodiment that specifically discloses the vehicular camera according to the present disclosure will be described in detail with reference to the drawings as appropriate. Unnecessarily detailed description may be omitted. For example, detailed description of already well-known matters and redundant description of substantially the same configuration may be omitted. This is to avoid unnecessary redundancy of the following description and facilitate understanding by those skilled in the art. It should be noted that the accompanying drawings and the following description are provided for those skilled in the art to sufficiently understand the present disclosure, and are not intended to limit the subject matter described in the claims.

Figure 1A:
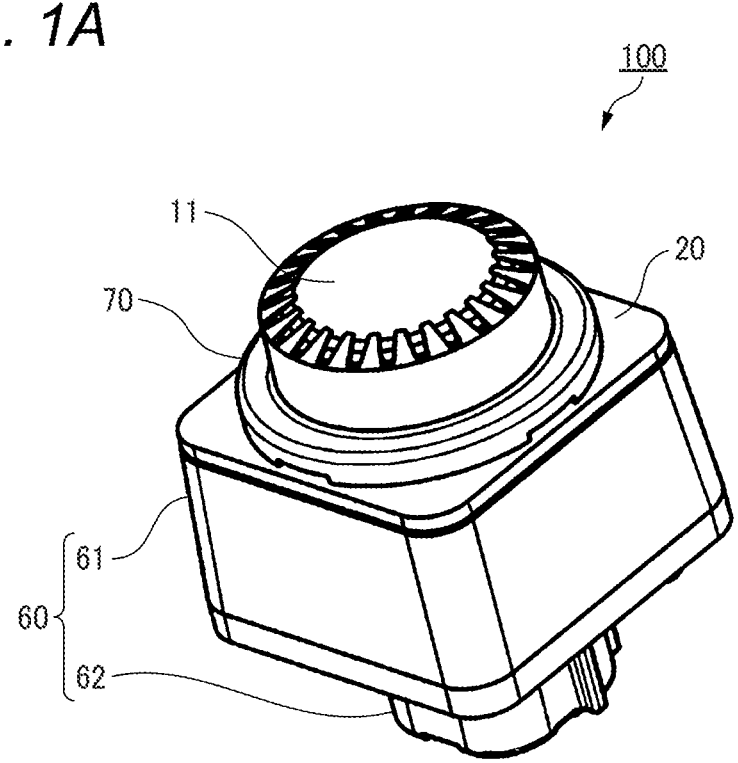
FIG. 1A is a top perspective view of a vehicular camera according to an embodiment.
Figure 1B:
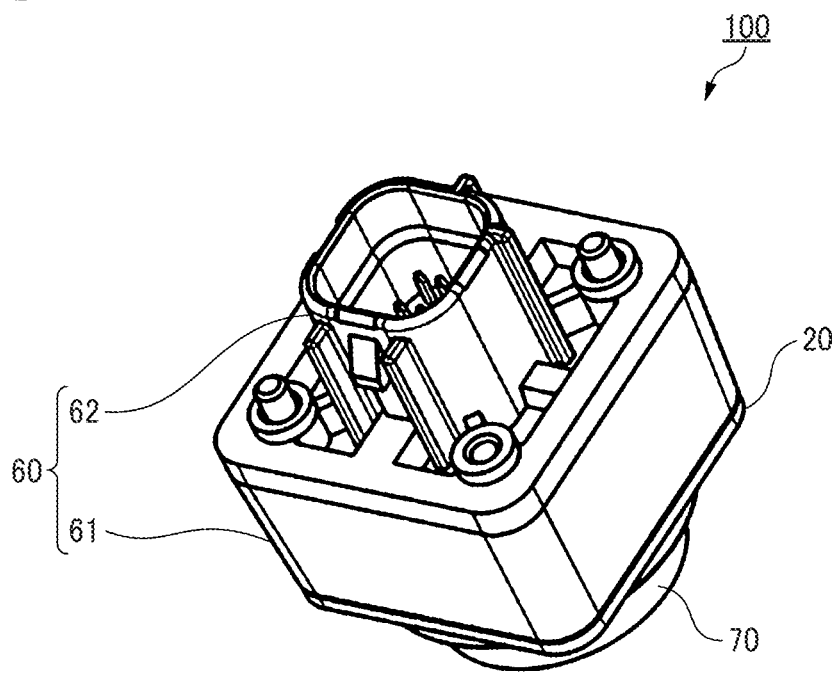
FIG. 1B is a bottom perspective view of the vehicular camera according to the embodiment.
Figure 2:
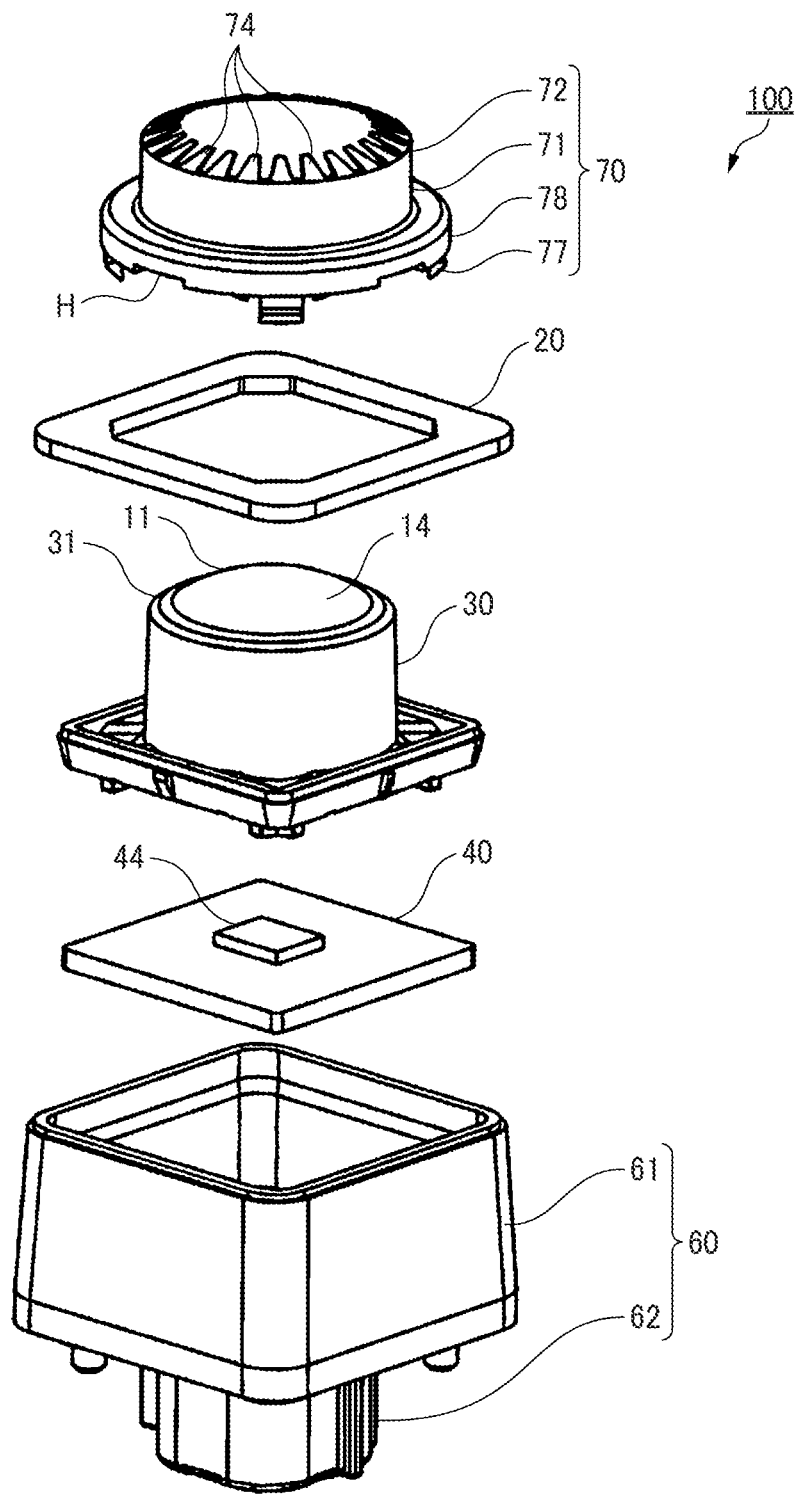
FIG. 2 is an exploded perspective view of the vehicular camera according to the embodiment.
Figure 3:
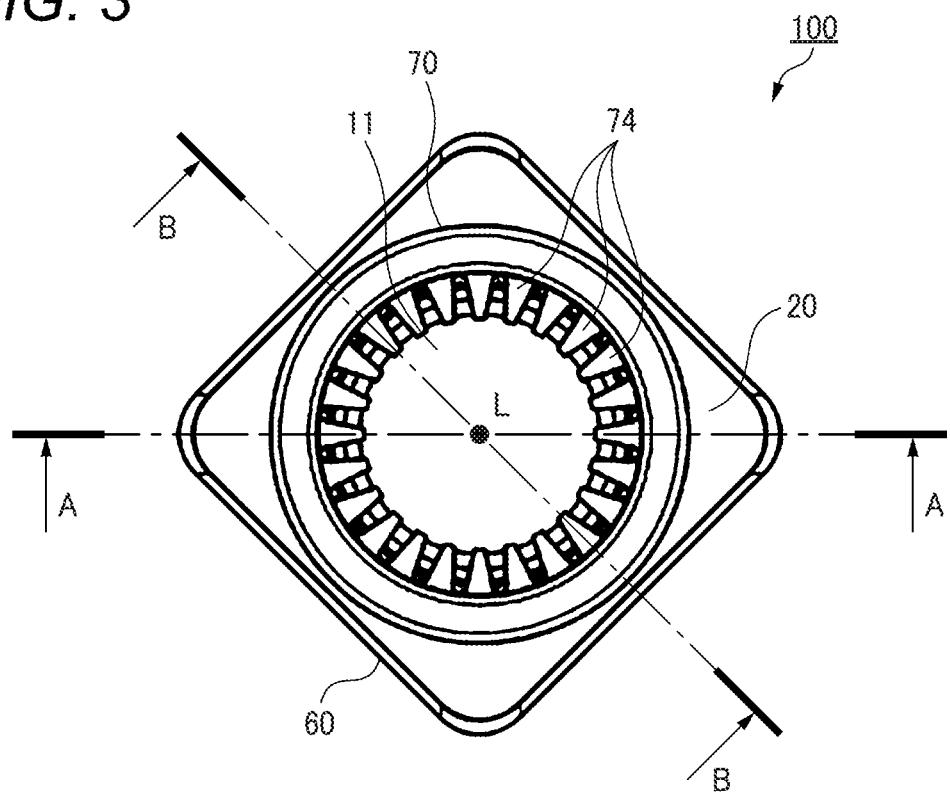
FIG. 3 is a top view of the vehicular camera according to the embodiment.
Figure 4:
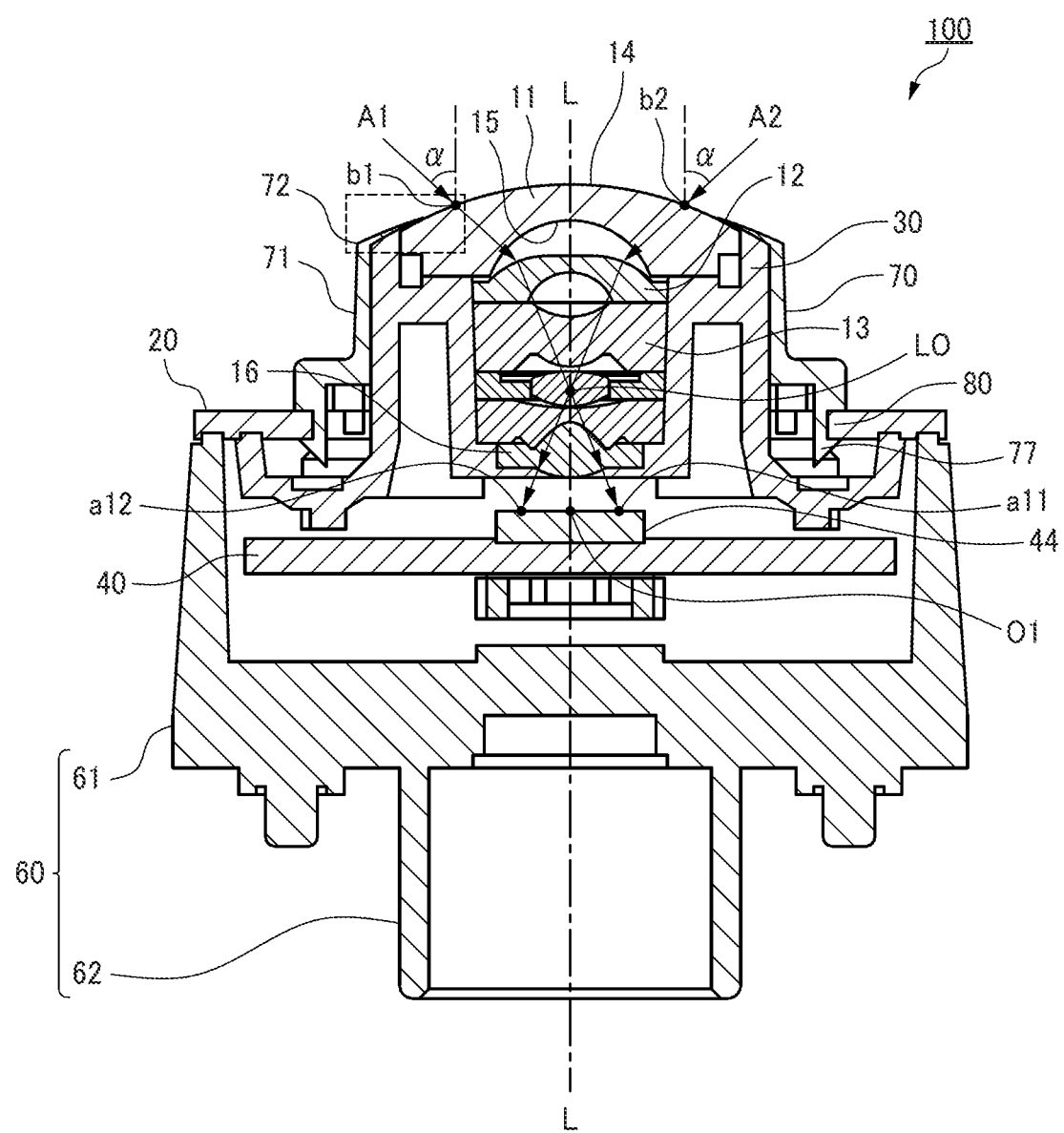
FIG. 4 is a cross-sectional view taken along a line A-A in FIG. 3.
Figure 5A:
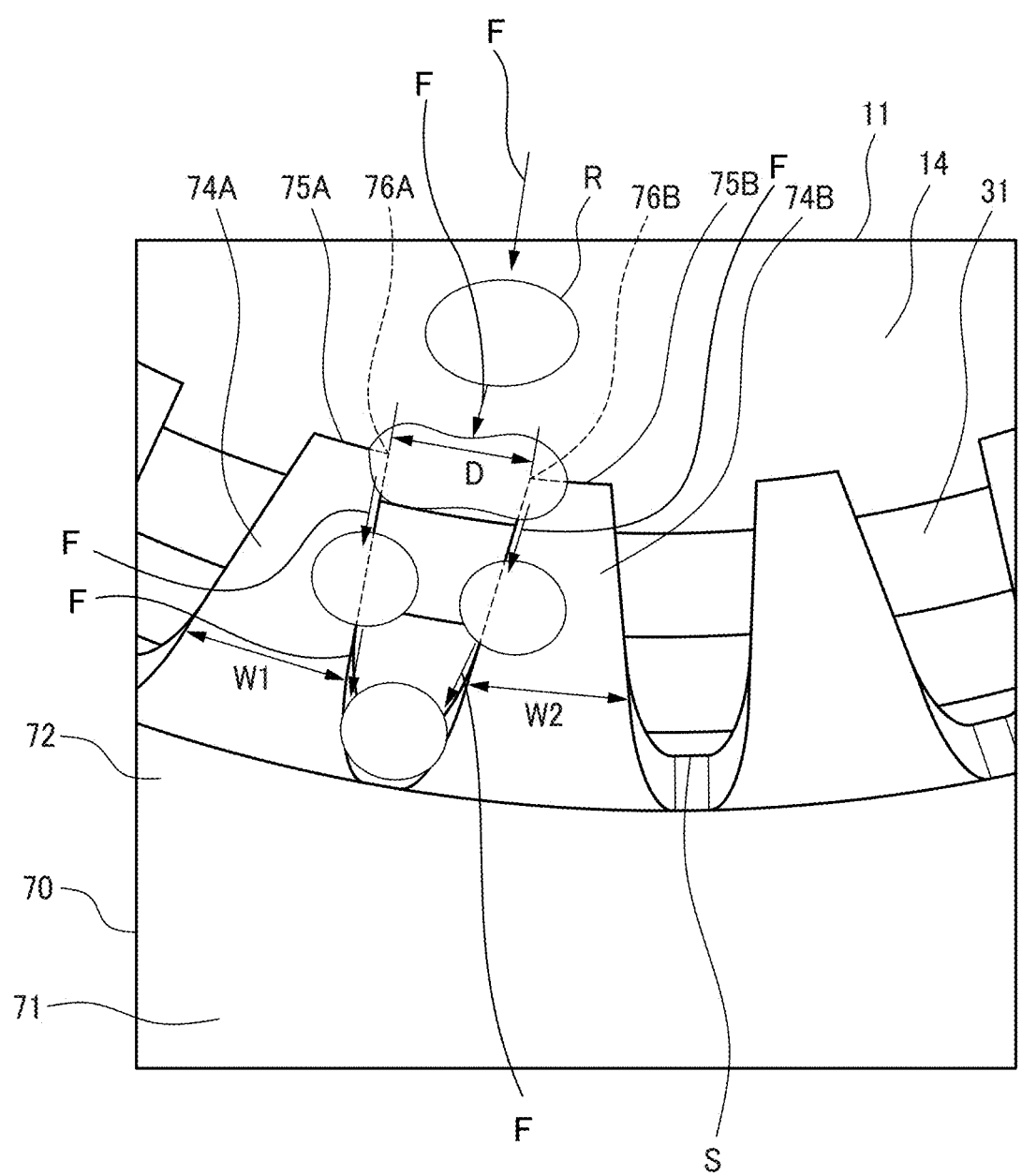
FIG. 5A is a perspective view illustrating a state in which a liquid foreign object is dispersed and removed from the vehicular camera according to the embodiment.
Figure 5B:
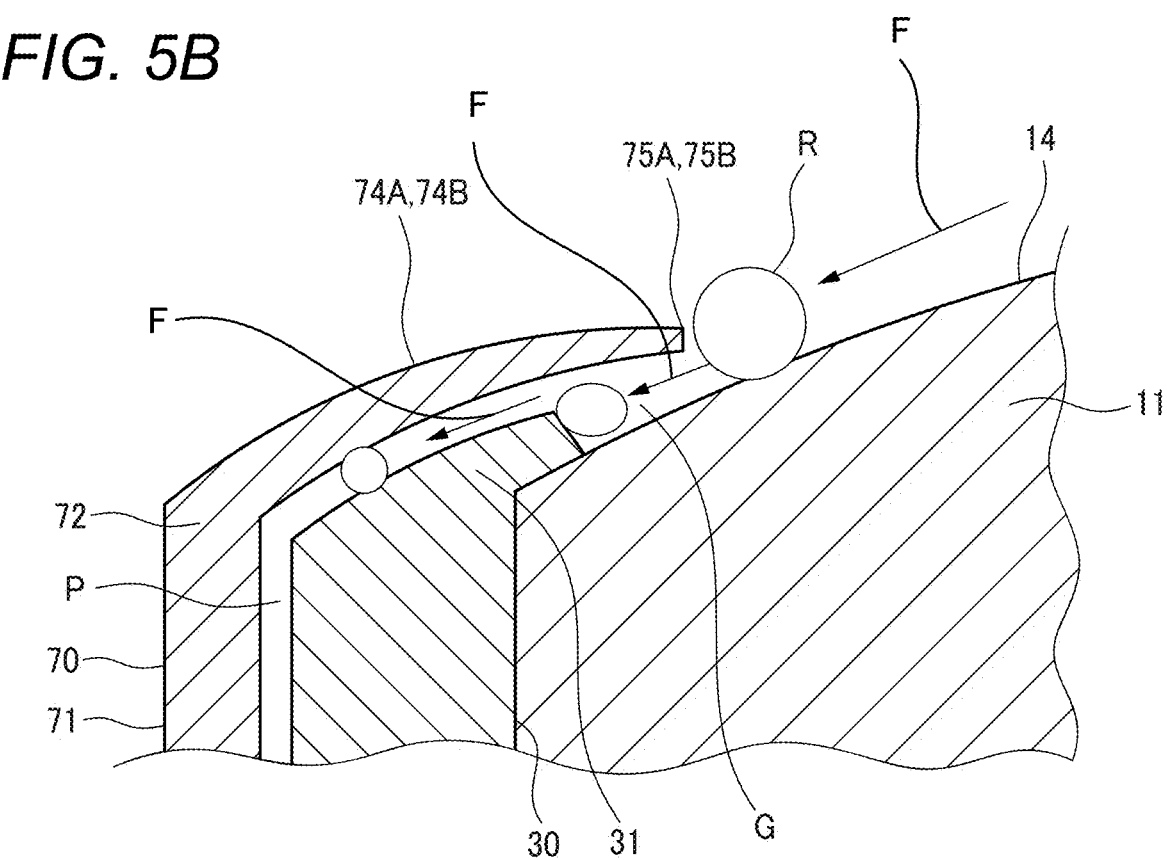
FIG. 5B is a cross-sectional view illustrating a state in which the foreign object is dispersed and removed from the vehicular camera according to the embodiment.
Figure 6:
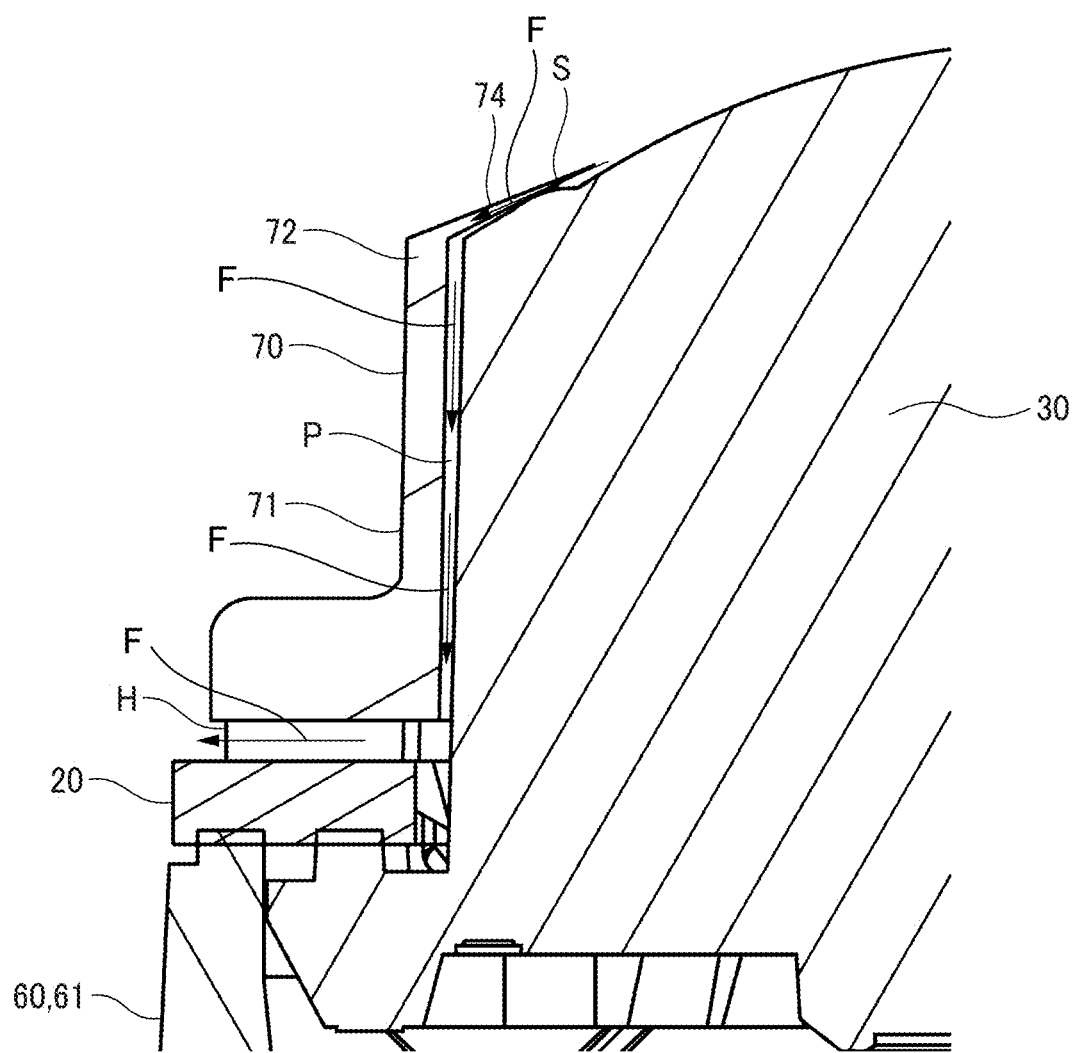
FIG. 6 is a cross-sectional view of a portion taken along a line B-B in FIG. 3.
Figure 7:
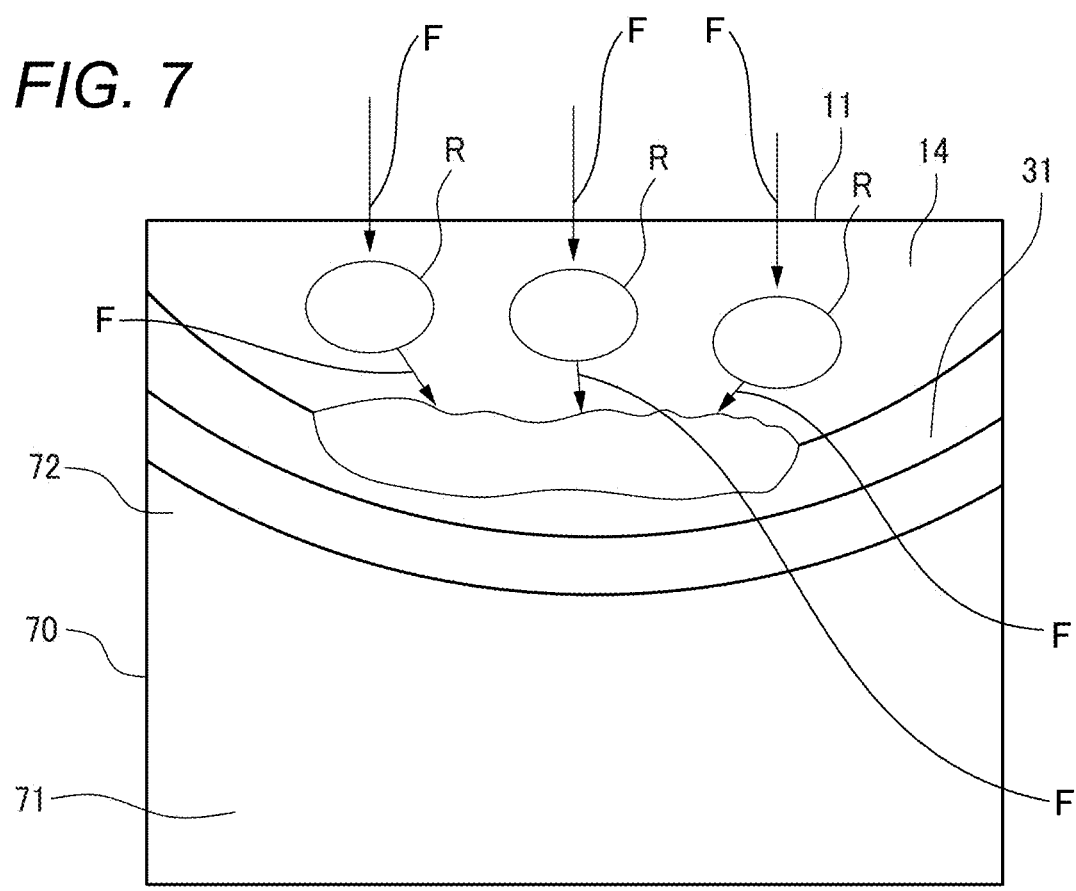
FIG. 7 is a perspective view illustrating a state in which the foreign object accumulates in a vehicular camera in the related art.
Figure 8:
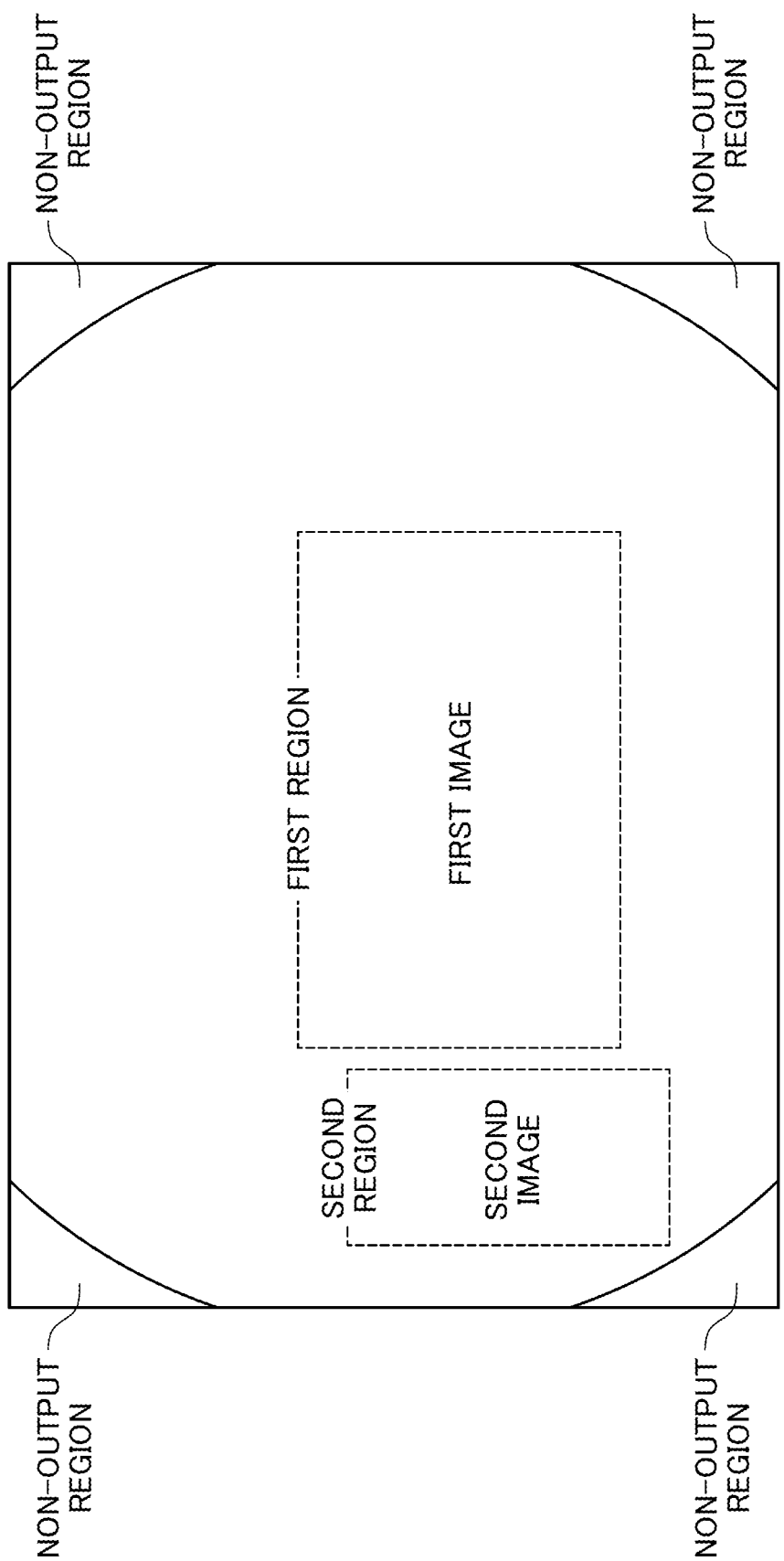
FIG. 8 shows an image captured by the vehicular camera according to the embodiment.

FIG. 1A is a top perspective view of a vehicular camera 100 according to an embodiment. FIG. 1B is a bottom perspective view of the vehicular camera 100 according to the embodiment. FIG. 2 is an exploded perspective view of the vehicular camera 100 according to the embodiment. FIG. 3 is a top view of the vehicular camera 100 according to the embodiment. FIG. 4 is a cross-sectional view taken along a line A-A in FIG. 3. FIG. 5A is a perspective view illustrating a state in which a liquid foreign object is dispersed and removed from the vehicular camera 100 according to the embodiment. FIG. 5B is a cross-sectional view illustrating a state in which the foreign object is dispersed and removed from the vehicular camera 100 according to the embodiment. In particular, FIG. 5B is an enlarged view of the inside of a dotted rectangular frame on an upper left side of FIG. 4. FIG. 6 is a cross-sectional view of a portion taken along a line B-B in FIG. 3. FIG. 7 is a perspective view illustrating a state in which the foreign object accumulates in a vehicular camera in the related art. FIG. 8 shows an image captured by the vehicular camera 100 according to the embodiment.

The vehicular camera 100 is an imaging device that is installed at front and rear ends, left and right side surfaces and the like of a vehicle body of a vehicle and captures the inside and outside of the vehicle body of the vehicle. In recent years, development of the vehicular camera 100 has become active with demands for improvements in vehicle safety, introduction of autonomous driving functions and the like.

The vehicular camera 100 according to the present embodiment includes lenses (for example, a first lens 11, a second lens 12, a third lens 13, a fourth lens, a fifth lens, and a sixth lens 16), a lens barrel 30, a circuit board 40, an imaging element 44, a housing 60, and a cap 70. The vehicular camera 100 according to the present embodiment may further include a ring member 20 as illustrated in FIG. 1A, FIG. 1B, or FIG. 2.

The lens barrel 30 has a first tubular shape. The lens barrel 30 is constituted by a single barrel piece. The barrel piece constituting the lens barrel 30 accommodates at least six lenses including the first lens 11, the second lens 12, the third lens 13, the fourth lens, the fifth lens, and the sixth lens 16. The first lens 11 has an optical axis L (see FIGS. 3 and 4), and the second lens 12, the third lens 13, the fourth lens, the fifth lens, and the sixth lens 16 are disposed along the optical axis L. That is, the first lens 11, the second lens 12, the third lens 13, the fourth lens, the fifth lens, and the sixth lens 16 are disposed in this order from an optical path upstream side toward the imaging element 44, and are held by a barrel piece 30a in a state in which optical axes thereof are aligned with each other, thereby constituting a lens group used for capturing the inside and outside of the vehicle body.

For example, when light A1 enters a position b1 of the lens group (see the above description) at an incident angle α, an image is formed in a position indicated by a point a11 on the imaging element 44. When light A2 enters the lens group (see the above description) at the incident angle α from a position b2 opposite to the light A1 across the optical axis L, an image is formed in a position indicated by a point a12 on the imaging element 44. A point LO is a point at which light entering the lens group (see the above description) intersects the optical axis L. The optical axis L of the lens group (see the above description) intersects the imaging element 44 at a point O1. The point O1 indicates a position corresponding to an image center on the imaging element 44. The image center is a position serving as a center of an image when the image is output based on an image signal generated by the imaging element 44.

The lens barrel 30 is disposed along the optical axis L, and the optical axis L passes through the lens barrel 30. The first lens 11 is disposed at one end portion of the first tubular shape that is the shape of the lens barrel 30, and the second lens 12 is disposed inside the first tubular shape.

The lens barrel 30 is formed of, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin. One or a plurality of types of resins may be used. A main resin may contain an absorbent that absorbs laser light, a coloring material, or both.

The circuit board 40 is disposed on the optical axis L in an internal space of the housing 60. The imaging element 44 is mounted on the circuit board 40. The imaging element 44 is disposed on the optical axis L on the circuit board 40, and receives and captures light passing through the first lens 11 and the second lens 12 in this order.

The ring member 20 is constituted by a flat plate having a rectangular annular shape in plan view, and is fixed to the lens barrel 30 and the housing 60. The ring member 20 is disposed around an entire circumference (that is, the entire circumference of the lens 10 about the optical axis L) of the lens barrel 30 and protrudes in a direction apart from the optical axis L.

The ring member 20 is formed of, for example, a polyester resin, a polyolefin resin, a polyamide resin, a vinyl chloride resin, or a fluorine resin. Examples of the polyester resin include polybutylene terephthalate (PBT) and polyethylene terephthalate (PET). Examples of the polyolefin resin include polyethylene and polypropylene. One or a plurality of types of resins may be used. In a case of using laser welding to be described later, a coloring material, a filler, or both may be contained in a main light transmitting resin as long as a transmission performance of a certain level or more can be achieved.

Although the ring member 20 has a flat rectangular annular shape in the present embodiment, the shape is not limited thereto as long as a welded portion has a flat plate shape. Accordingly, the shape is not limited to a polygonal shape such as a rectangular annular shape, and may be a circular annular shape or an annular shape other than the circular annular shape such as an elliptical annular shape. In addition, steps, thicknesses, and the like may not be uniform in portions other than the welded portion.

The housing 60 is a member having the internal space and having a tubular shape at least at a part thereof, and includes a large diameter tubular portion 61 and a small diameter tubular portion 62. The large diameter tubular portion 61 has a cross-sectional area larger than that of the small diameter tubular portion 62 when assuming a cross section in a plane orthogonal to the optical axis L, and has a rectangular cross section, so does the small diameter tubular portion 62. The large diameter tubular portion 61 accommodates at least the circuit board 40 therein. The small diameter tubular portion 62 mainly accommodates a connector (to be described later) that ensures electrical connection to the outside (for example, a control circuit component such as an electric control unit (ECU) disposed in the vehicle body of the vehicle to which the vehicular camera 100 is attached) of the vehicular camera 100. The large diameter tubular portion 61 and the small diameter tubular portion 62 may be integrally formed, and the large diameter tubular portion 61 and the small diameter tubular portion 62 prepared individually in advance may be joined by a method such as welding or screwing. Although the housing 60 has a rectangular tubular shape in the present embodiment, the shape is not limited thereto, and may be a polygonal tubular shape other than the rectangular tubular shape, a circular or elliptical tubular shape, or another tubular shape.

The housing 60 is formed of, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin. One or a plurality of types of resins may be used. In a case of using laser welding to be described later, a main light absorbing resin may contain an absorbent that absorbs laser light, a coloring material, or both.

As illustrated in FIG. 4, the ring member 20 is fixed to the lens barrel 30 and one end surface of the housing 60. The fixing can be implemented by, for example, laser welding. Specifically, in the present embodiment, the one tubular end surface of the housing 60 and the ring member 20 are fixed by laser welding by laser beams transmitted through the ring member 20. By the fixing using laser welding, the ring member 20 and the housing 60 can be easily and reliably fixed. Accordingly, the lens barrel 30 is fixed to the housing 60 via the ring member 20.

It should be noted that the housing 60 may accommodate a metal shield for shielding the circuit board 40 from external electromagnetic waves.

Next, the cap 70 will be described. Before describing the cap 70, the first lens 11 and the lens barrel 30 will be described again. The first lens 11 is located opposite to the second lens 12, and has a first surface 14 (see FIG. 4) that is a convex curve surface, and a second surface 15 (see FIG. 4) opposite to the first surface 14. The lens barrel 30 includes, at the one end portion of the first tubular shape, a first edge portion 31 that overlaps at least a part of a circumference of the first surface 14 of the first lens 11 in a top view of the vehicular camera 100. As to be described later, the first edge portion 31 has a shape of a crimping portion that crimps the first lens 11 by bending a top end of the lens barrel 30, and is bent toward the optical axis L. In this way, since the first lens 11 is crimped by the first edge portion 31, a step is created between the first lens 11 and the first edge portion 31. Accordingly, a foreign object R such as a raindrop may easily adhere to the step.

The cap 70 is a cap-shaped member that covers the lens barrel 30, and is formed by molding a resin material, for example, and may further be formed of a metal material, and the material is not particularly limited.

The cap 70 includes a barrel portion 71 and a second edge portion 72. The barrel portion 71 extends parallel to the optical axis L, and has a second tubular shape on an outer circumference of the first tubular shape of the lens barrel 30. The second edge portion 72 is integrally coupled to and continuous with the barrel portion 71 at one end portion of the barrel portion 71, and at least a part thereof overlaps the circumference of the first surface 14 of the first lens 11 in a top view of the vehicular camera 100, and overlaps the first edge portion 31 of the lens barrel 30 in a top view of the vehicular camera 100.

The cap 70 further includes a flange portion 78 (see FIG. 2) extending outward at the other end portion of the barrel portion 71. The flange portion 78 includes an engagement protrusion 77 (see FIG. 2) and a drain hole H (see FIG. 2). Functions of the engagement protrusion 77 and the drain hole H will be described later.

The second edge portion 72 of the cap 70 includes a plurality of protrusions 74 (see FIG. 2). Each of the protrusions 74 protrudes in a direction from the barrel portion 71 of the cap 70 toward the optical axis L along the first surface 14 of the first lens 11. The number of the plurality of protrusions 74 is not particularly limited.

As illustrated in FIG. 5A, attention is paid to a first protrusion 74A and a second protrusion 74B of the protrusion 74. The first protrusion 74A and the second protrusion 74B are adjacent to each other. A part of the first protrusion 74A overlaps the first edge portion 31 of the lens barrel 30, and a part of the second protrusion 74B also overlaps the first edge portion 31 in a top view of the vehicular camera 100. Here, the meaning of "overlap" includes both a case where at least a part of the first protrusion 74A and the second protrusion 74B is in contact with the first edge portion 31 and a case where neither is in contact with the first edge portion 31.

The first protrusion 74A includes a first top portion 75A at a top end on an optical axis L side, and the second protrusion 74B also includes a second top portion 75B at a top end on the optical axis L side. The first top portion 75A and the second top portion 75B are located closer to the optical axis L than the first edge portion 31 of the lens barrel 30 is.

Further, the first surface 14 of the first lens 11 is exposed between the first top portion 75A of the first protrusion 74A and the second top portion 75B of the second protrusion 74B. That is, the first top portion 75A and the second top portion 75B are located apart from each other on the first surface 14 of the first lens 11.

Other adjacent protrusions other than the first protrusion 74A and the second protrusion 74B may also have structures equivalent to those of the first protrusion 74A and the second protrusion 74B.

When the vehicular camera 100 is mounted on the vehicle, the first lens 11 is exposed to the outside and to an external environment. Accordingly, the liquid foreign object R including raindrops on rainy days, splashes of muddy water and the like may adhere to the first lens 11 when the vehicle is traveling. Apparently, the foreign object R is highly likely to deteriorate an imaging function of the vehicular camera 100.

The foreign object R tends to move to the circumference of the first lens 11 (in other words, an end side apart from the optical axis L) due to an influence of wind crossing the vehicle body when the vehicle is traveling. In particular, since the first lens 11 is crimped by the first edge portion 31, a step is generated between the first lens 11 and the first edge portion 31. Accordingly, the foreign object R such as raindrops may easily adhere to the step. In the present embodiment, as illustrated in FIGS. 5A and 5B, when the foreign object R moves to the circumference of the first lens 11, the first protrusion 74A and the second protrusion 74B provided around the first lens 11 disperse the foreign object R and reduce the size thereof. That is, the foreign object R collides with the first top portion 75A and the second top portion 75B of the first protrusion 74A and the second protrusion 74B, and is thus dispersed into a smaller size. Thus, the foreign object R can be easily removed. Accordingly, the foreign object R can be prevented from interfering with imaging and the imaging function of the vehicular camera 100 can be ensured.

A part of the first edge portion 31 of the lens barrel 30 is exposed between the first protrusion 74A and second protrusion 74B. Accordingly, since the first protrusion 74A and the second protrusion 74B remove the foreign object R on a part of the first edge portion 31, the imaging function of the vehicular camera 100 can be more reliably ensured.

As illustrated in FIG. 5A, a gap space S between an outer side surface of the first tubular shape of the lens barrel 30 and an inner side surface of the second tubular shape of the barrel portion 71 of the cap 70 is exposed between the first protrusion 74A and the second protrusion 74B. The gap space S is exposed around the first edge portion 31 of the lens barrel 30. Accordingly, the foreign object R can be smoothly discharged to the outside of the vehicular camera 100 through the gap space S.

As illustrated in FIGS. 2 and 6, the cap 70 has at least one drain hole H in the other end portion and/or a side surface of the second tubular shape of the barrel portion 71 of the cap 70. In the present embodiment, a plurality of drain holes H are provided in a side surface of the flange portion 78 at the other end portion of the barrel portion 71. As illustrated in FIGS. 5B and 6, a passage P continuous to at least one drain hole H from the above-described gap space S is provided. Accordingly, the foreign object R discharged to the gap space S can be smoothly removed through the passage P and the drain hole H as indicated by arrows F in FIG. 6.

The plurality of protrusions 74 are desirably disposed over at least a half circumference of the first edge portion 31 of the lens barrel 30. Accordingly, the liquid foreign object R adhering to the first lens 11 can be efficiently removed. In the present embodiment, the plurality of protrusions 74 are disposed over the entire circumference of the first edge portion 31. Accordingly, the liquid foreign object R adhering to the first lens 11 can be more efficiently removed.

The protrusion 74 will be described in more detail. As illustrated in FIG. 5A, the first top portion 75A of the first protrusion 74A includes a first corner portion 76A on a second protrusion 74B side, and the second top portion 75B of the second protrusion 74B also includes a second corner portion 76B on a first protrusion 74A side. The first corner portion 76A and the second corner portion 76B are located at respective ends of the first top portion 75A and the second top portion 75B.

The first corner portion 76A and the second corner portion 76B have vertices formed by two sides intersecting at an angle close to 90 degrees, for example. Accordingly, when the first corner portion 76A and the second corner portion 76B come into contact with the liquid foreign object R, the foreign object R can be easily broken, and thus the foreign object R can be efficiently dispersed.

A distance D between the first corner portion 76A of the first top portion 75A of the first protrusion 74A and the second corner portion 76B of the second top portion 75B of the second protrusion 74B is set to be, for example, 1.0 mm or less. Accordingly, the large-sized foreign object R having a high probability of adhering can be efficiently dispersed.

A first width W1 of the first protrusion 74A increases from the first top portion 75A toward the barrel portion 71, and a second width W2 of the second protrusion 74B increases from the second top portion 75B toward the barrel portion 71. Accordingly, the first protrusion 74A and the second protrusion 74B are firmly fixed to the second edge portion 72 of the barrel portion 71.

As illustrated in FIG. 5B, at least a part of the thickness of the first protrusion 74A increases from the first top portion 75A toward the barrel portion 71, and at least a part of the thickness of the second protrusion 74B increases from the second top portion 75B toward the barrel portion 71. Accordingly, the first protrusion 74A and the second protrusion 74B are firmly fixed to the second edge portion 72 of the barrel portion 71, and the foreign object R can be efficiently dispersed.

A gap G is present between the first top portion 75A of the first protrusion 74A and the first surface 14 of the first lens 11, and between the second top portion 75B of the second protrusion 74B and the first surface 14 of the first lens 11. Accordingly, the first surface 14 of the first lens 11 can be prevented from damage.

As illustrated in FIG. 7, in a vehicular camera in the related art, the first protrusion 74A and the second protrusion 74B are not provided, the foreign object R accumulates on the first edge portion 31 of the lens barrel 30, and the imaging function of the vehicular camera may deteriorate due to the foreign object R moving to the lens.

The lens barrel 30 is formed of resin, for example. The first edge portion 31 of the lens barrel 30 softens when heat is applied to the top end of the lens barrel 30, and functions as a crimping portion that crimps the first lens 11 by bending the top end of the lens barrel 30. Accordingly, the lens barrel 30 can easily and firmly hold the first lens 11.

The cap 70 is desirably fixed to the housing 60 or the lens barrel 30. Accordingly, a function of removing the foreign object R can be maintained. In the present embodiment, as illustrated in FIG. 4, the engagement protrusion 77 of the cap 70 engages with an engagement portion 80 formed on the housing 60 or the lens barrel 30. Accordingly, the function of removing the foreign object R can be maintained with high reliability.

Regarding the lens, at least the first lens 11 is constituted by, for example, a fish-eye lens. Accordingly, the vehicular camera 100 can capture an image over a wide range. An angle of view of the fish-eye lens is desirably 160 degrees or more and 200 degrees or less in a horizontal direction. Accordingly, the vehicular camera 100 can capture an appropriate image over a wide range.

As illustrated in FIG. 8, the first lens 11 constituted by a fish-eye lens can output an image including a first image corresponding to a first region including the optical axis L on the first surface 14 and a second image corresponding to a second region at least a part of which is closer to the first edge portion than the first region is on the first surface 14 of the first lens 11.

At a peripheral edge of the image, there is a non-output region in which no image is output due to the first edge portion 31 of the lens barrel 30 that crimps the first lens 11. Although the second region is present in a vicinity of the non-output region, in the vehicular camera in the related art, the foreign object R illustrated in FIG. 7 may also appear in the second image in the second region when the foreign object R is present, and the imaging function may deteriorate. On the other hand, the vehicular camera 100 according to the present embodiment can appropriately remove the foreign object R, and thus the foreign object R can be prevented from being also projected in the second image in the second region. Accordingly, an appropriate image can be captured over a wide range.

As illustrated in FIG. 8, the vehicular camera 100 can output the first image and the second image as one image signal. Accordingly, it is possible to output an easily recognizable image.

The present disclosure describes at least the following matters. Components corresponding to those in the above-described embodiment are shown in parentheses, but the present invention is not limited thereto.

(1) A vehicular camera (vehicular camera 100) according to the present disclosure includes:
at least a first lens (first lens 11) having an optical axis (optical axis L) and a second lens (second lens 12) disposed along the optical axis;
a lens barrel (lens barrel 30) disposed along the optical axis, the lens barrel having a first tubular shape through which the optical axis passes, the first lens being disposed at one end portion of the first tubular shape and the second lens being disposed inside the first tubular shape;

an imaging element (imaging element 44) disposed on the optical axis and configured to receive light passed through the first lens and the second lens in this order;
a circuit board (circuit board 40) on which the imaging element is mounted;
a housing (housing 60) accommodating at least the circuit board and to which the lens barrel is fixed; and
a cap (cap 70), wherein
the first lens has a first surface (first surface 14) located opposite to the second lens, the first surface being a convex curve surface, and a second surface (second surface 15) opposite to the first surface,
the lens barrel includes, at the one end portion of the first tubular shape, a first edge portion (first edge portion 31) overlapping at least a part of a circumference of the first surface of the first lens,
the cap includes a barrel portion (barrel portion 71) having a second tubular shape and disposed to an outer circumference of the first tubular shape of the lens barrel and a second edge portion (second edge portion 72) continuous with the barrel portion at one end portion of the barrel portion, at least a part of the second edge portion overlapping the circumference of the first surface of the first lens and overlapping the first edge portion,
the second edge portion of the cap includes a plurality of protrusions (protrusion 74),
each of the plurality of protrusions is oriented from the barrel portion of the cap toward the optical axis, and protrudes along the first surface of the first lens,
a first protrusion (first protrusion 74A) among the plurality of protrusions and a second protrusion (second protrusion 74B) among the plurality of protrusions are disposed adjacent to each other,
a part of the first protrusion overlaps the first edge portion,
a part of the second protrusion overlaps the first edge portion,
a first top portion (first top portion 75A) of the first protrusion and a second top portion (second top portion 75B) of the second protrusion are closer to the optical axis than the first edge portion is, and
the first surface of the first lens is exposed between the first top portion of the first protrusion and the second top portion of the second protrusion.

Accordingly, in a vehicular camera, the first protrusion and the second protrusion provided around the first lens can disperse and remove a liquid foreign object including a raindrop or the like adhering to the first lens. Accordingly, the foreign object can be prevented from interfering with imaging and an imaging function of the vehicular camera can be ensured.

(2) In the vehicular camera according to (1), wherein
a part of the first edge portion of the lens barrel is exposed between the first protrusion and the second protrusion.

Accordingly, in the vehicular camera, since the first protrusion and the second protrusion remove the foreign object on a part of the first edge portion of the lens barrel, the imaging function of the vehicular camera can be more reliably ensured.

(3) In the vehicular camera according to (2), wherein
a gap space (gap space S) between an outer side surface of the first tubular shape of the lens barrel and an inner side surface of the second tubular shape of the barrel portion of the cap is exposed between the first protrusion and the second protrusion.

Accordingly, in the vehicular camera, the foreign object can be smoothly discharged through the gap space.

(4) The vehicular camera according to (3) further includes:
at least one hole (drain hole H) in another end portion and/or a side surface of the second tubular shape of the barrel portion of the cap, wherein
a passage (passage P) continuous to the at least one hole from the gap space is provided.

Accordingly, in the vehicular camera, the foreign object discharged to the gap space can be smoothly removed through the passage and the drain hole.

(5) In the vehicular camera according to (1), wherein
the plurality of protrusions are disposed over at least a half circumference of the first edge portion of the lens barrel.

Accordingly, in the vehicular camera, the liquid foreign object adhering to the first lens can be efficiently removed.

(6) In the vehicular camera according to (1), wherein
the plurality of protrusions are disposed over an entire circumference of the first edge portion of the lens barrel.

Accordingly, in the vehicular camera, the liquid foreign object adhering to the first lens can be more efficiently removed.

(7) In the vehicular camera according to (1), wherein
the first top portion of the first protrusion includes a first corner portion (first corner portion 76A) on a second protrusion side, and
the second top portion of the second protrusion includes a second corner portion (second corner portion 76B) on a first protrusion side.

Accordingly, in the vehicular camera, the first corner portion of the first top portion and the second corner portion of the second protrusion come into contact with the liquid foreign object, and the foreign object can be efficiently dispersed.

(8) In the vehicular camera according to (7), wherein
a distance between the first corner portion of the first top portion of the first protrusion and the second corner portion of the second top portion of the second protrusion is 1.0 mm or less.

Accordingly, in the vehicular camera, the large-sized foreign object having a high probability of adhering can be efficiently dispersed.

(9) In the vehicular camera according to (1), wherein
a first width of the first protrusion increases from the first top portion toward the barrel portion, and
a second width of the second protrusion increases from the second top portion toward the barrel portion.

Accordingly, in the vehicular camera, the first protrusion and the second protrusion are firmly fixed to the second edge portion of the barrel portion.

(10) In the vehicular camera according to (1), wherein
a thickness of at least a part of the first protrusion increases from the first top portion toward the barrel portion, and
a thickness of at least a part of the second protrusion increases from the second top portion toward the barrel portion.

Accordingly, in the vehicular camera, the first protrusion and the second protrusion are firmly fixed to the second edge portion of the barrel portion, and the foreign object can be efficiently dispersed.

(11) In the vehicular camera according to (1), wherein
a gap (gap G) is present between the first top portion of the first protrusion and the first surface of the first lens, and a gap (gap G) is present between the second top portion of the second protrusion and the first surface of the first lens.

Accordingly, in the vehicular camera, the first surface of the first lens can be prevented from damage.

(12) In the vehicular camera according to (1), wherein the first edge portion of the lens barrel is a crimping portion that crimps the first lens by bending a top end of the lens barrel.

Accordingly, in the vehicular camera, the lens barrel can easily and firmly hold the first lens.

(13) In the vehicular camera according to (1), wherein the cap is fixed to the housing or the lens barrel.

Accordingly, in the vehicular camera, a function of removing the foreign object can be maintained.

(14) In the vehicular camera according to (13), wherein an engagement protrusion (engagement protrusion 77) of the cap engages with an engagement portion (engagement portion 80) formed on the housing or the lens barrel.

Accordingly, in the vehicular camera, the function of removing foreign object can be maintained with high reliability.

(15) In the vehicular camera according to (1), wherein at least the first lens is a fish-eye lens.

Accordingly, the vehicular camera can capture an image over a wide range.

(16) In the vehicular camera according to (15), wherein an angle of view of the fish-eye lens is 160 degrees or more and 200 degrees or less in a horizontal direction.

Accordingly, the vehicular camera can capture an appropriate image over a wide range.

(17) In the vehicular camera according to (1), wherein the vehicular camera is configured to output a first image corresponding to a first region including the optical axis on the first surface of the first lens, and a second image corresponding to a second region at least a part of which is closer to the first edge portion than the first region is on the first surface of the first lens.

Accordingly, the vehicular camera can capture an appropriate image over a wide range.

(18) In the vehicular camera according to (17), wherein the first image and the second image are configured to be output as one image signal.

Accordingly, the vehicular camera can output an easily recognizable image.

Although the embodiment has been described above with reference to the accompanying drawings, the present disclosure is not limited to such an embodiment. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiment described above may be combined freely in a range without departing from the gist of the invention.

INDUSTRIAL APPLICABILITY

The present disclosure is useful as a vehicular camera that prevents a liquid foreign object adhering to a lens from interfering with imaging by dispersing and removing the foreign object and ensures an imaging function of the vehicular camera.

What is claimed is:

1. A vehicular camera comprising:
a first lens having an optical axis;
a second lens disposed along the optical axis;
a lens barrel disposed along the optical axis, the lens barrel having a first tubular shape through which the optical axis passes, the first lens being disposed at one end portion of the first tubular shape and the second lens being disposed inside the first tubular shape;
an imaging element disposed on the optical axis and receiving light passed through the first lens and the second lens in this order;
a circuit board on which the imaging element is mounted;
a housing accommodating at least the circuit board and to which the lens barrel is fixed; and
a cap, wherein
the first lens has a first surface located opposite to the second lens and being a convex curve surface, and a second surface opposite to the first surface,
the lens barrel includes, at the one end portion of the first tubular shape, a first edge portion overlapping at least a part of a circumference of the first surface of the first lens,
the cap includes a barrel portion having a second tubular shape and disposed to an outer circumference of the first tubular shape of the lens barrel, and a second edge portion continuous with the barrel portion at one end portion of the barrel portion, at least a part of the second edge portion overlapping the circumference of the first surface of the first lens and overlapping the first edge portion,
the second edge portion of the cap includes a plurality of protrusions,
each of the plurality of protrusions is oriented from the barrel portion of the cap toward the optical axis, and protrudes along the first surface of the first lens,
a first protrusion among the plurality of protrusions and a second protrusion among the plurality of protrusions are disposed adjacent to each other,
the first protrusion is oriented in a first direction from the barrel portion of the cap toward the optical axis,
the second protrusion is oriented in a second direction from the barrel portion of the cap toward the optical axis,
a part of the first protrusion overlaps the first edge portion,
a part of the second protrusion overlaps the first edge portion,
a first top portion of the first protrusion and a second top portion of the second protrusion are closer to the optical axis than the first edge portion,
the first surface of the first lens is exposed between the first top portion of the first protrusion and the second top portion of the second protrusion,
the plurality of protrusions are disposed over an entire circumference of the first edge portion of the lens barrel,
the first top portion of the first protrusion includes a first corner portion and a second corner portion along a third direction perpendicular to the first direction,
the second top portion of the second protrusion includes a third corner portion and a fourth corner portion along a fourth direction perpendicular to the second direction,
the first corner portion of the first top portion of the first protrusion is disposed on a side of the second protrusion, the second corner portion of the first top portion of the first protrusion is disposed farther than the first corner portion in the third direction with respect to the second protrusion, the third corner portion of the second top portion of the second protrusion is disposed on a side of the first protrusion, the fourth corner portion of the second top portion of the second protrusion is disposed farther than the third corner portion in the fourth direction with respect to the first protrusion, and a distance between the first corner portion of the first top portion of the first protrusion and the third corner portion of the second top portion of the second protrusion is 1.0 mm or less.

2. The vehicular camera according to claim 1, wherein a part of the first edge portion of the lens barrel is exposed between the first protrusion and the second protrusion.

3. The vehicular camera according to claim 2, wherein a gap space between an outer side surface of the first tubular shape of the lens barrel and an inner side surface of the second tubular shape of the barrel portion of the cap is exposed between the first protrusion and the second protrusion.

4. The vehicular camera according to claim 3, further comprising:

at least one hole in another end portion and/or a side surface of the second tubular shape of the barrel portion of the cap, wherein a passage continuous to the at least one hole from the gap space is provided.

5. The vehicular camera according to claim 1, wherein a first width of the first protrusion increases from the first top portion toward the barrel portion, and a second width of the second protrusion increases from the second top portion toward the barrel portion.

6. The vehicular camera according to claim 1, wherein a thickness of at least a part of the first protrusion increases from the first top portion toward the barrel portion, and a thickness of at least a part of the second protrusion increases from the second top portion toward the barrel portion.

7. The vehicular camera according to claim 1, wherein a gap is present between the first top portion of the first protrusion and the first surface of the first lens, and a gap is present between the second top portion of the second protrusion and the first surface of the first lens.

8. The vehicular camera according to claim 1, wherein the first edge portion of the lens barrel is a crimping portion that crimps the first lens by bending a top end of the lens barrel.

9. The vehicular camera according to claim 1, wherein the cap is fixed to the housing or the lens barrel.

10. The vehicular camera according to claim 9, wherein an engagement protrusion of the cap engages with an engagement portion formed on the housing or the lens barrel.

11. The vehicular camera according to claim 1, wherein at least the first lens is a fish-eye lens.

12. The vehicular camera according to claim 11, wherein an angle of view of the fish-eye lens is 160 degrees or more and 200 degrees or less in a horizontal direction.

13. The vehicular camera according to claim 1, wherein the vehicular camera is configured to output a first image corresponding to a first region including the optical axis on the first surface of the first lens, and a second image corresponding to a second region at least a part of which is closer to the first edge portion than the first region is on the first surface of the first lens.

14. The vehicular camera according to claim 13, wherein the vehicular camera is configured to output the first image and the second image as one image signal.

* * * * *